United States Patent
Izumi et al.

(10) Patent No.: US 6,547,253 B2
(45) Date of Patent: Apr. 15, 2003

(54) GASKET ATTACHMENT STRUCTURE FOR REFRIGERANT-SEAL

(75) Inventors: Ryoichi Izumi, Kariya (JP); Shinichi Inagaki, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/891,724

(22) Filed: Jun. 25, 2001

(65) Prior Publication Data
US 2002/0000695 A1 Jan. 3, 2002

(30) Foreign Application Priority Data
Jun. 26, 2000 (JP) .......................... 2000-191728

(51) Int. Cl.[7] ................................. F02F 11/00
(52) U.S. Cl. .................. 277/594; 277/592; 277/606; 277/611; 277/627
(58) Field of Search ................ 277/314, 384, 277/592, 606, 611, 627, 594

(56) References Cited

U.S. PATENT DOCUMENTS

| | | | |
|---|---|---|---|
| 3,537,733 A | * | 11/1970 | Martin |
| 4,819,973 A | * | 4/1989 | Pegon |
| 5,706,787 A | * | 1/1998 | Fujikawa |
| 5,938,208 A | * | 8/1999 | Yoshida et al. ............ 277/592 |
| 5,997,008 A | * | 12/1999 | Pflug |
| 6,209,884 B1 | * | 4/2001 | Taudt |

\* cited by examiner

*Primary Examiner*—Anthony Knight
*Assistant Examiner*—E Peavey
(74) *Attorney, Agent, or Firm*—Harness, Dickey & Pierce, PLC

(57) ABSTRACT

In an attachment structure of a gasket for a refrigerant-seal, both first and second connection members are disposed to define a seal space by first and second opposite surfaces and first and second wall surfaces, and the gasket having a beam portion is disposed in the seal space so that one end surface of the gasket is held on the first wall surface of the first connection member and the other end surface of the gasket is separated from the second wall surface of the second connection member by a predetermined clearance, before both the first and second connection members are fastened. After both the first and second connection members are fastened, the gasket extends, and the other end surface of the gasket press-contacts the second wall surface.

18 Claims, 7 Drawing Sheets

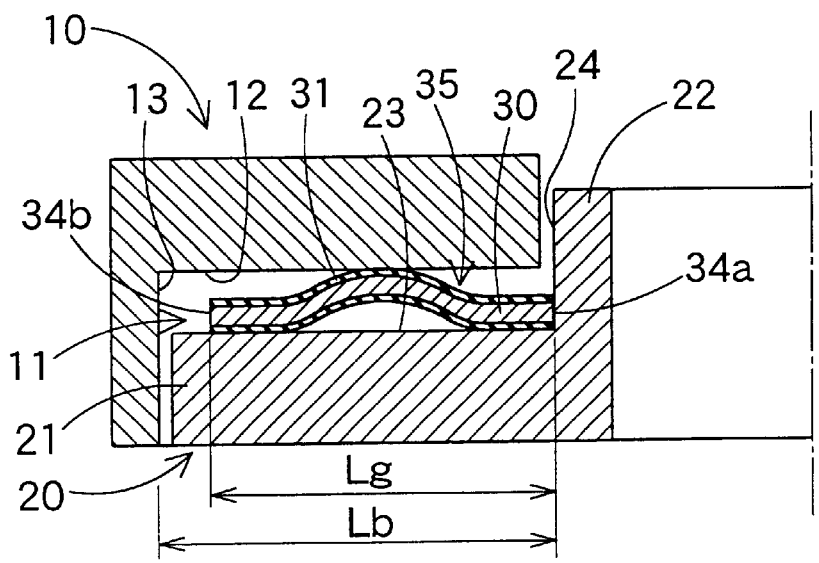
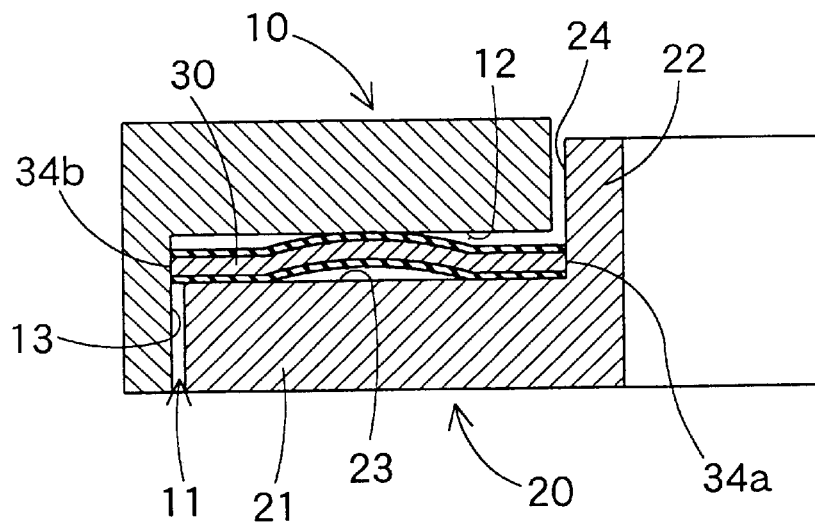
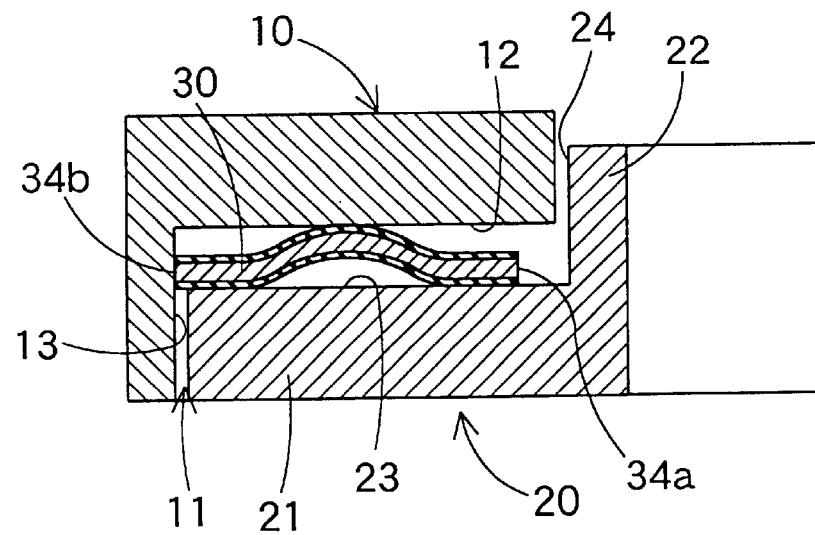

FIG. 4A

| SAMPLE | | A | B | C | COMPARISON |
|---|---|---|---|---|---|
| METAL PORTION | MATERIAL | ALUMINUM | SPCC | SUS | IIR O-RING |
| COATING LAYER | MATERIAL | NBR | NBR | NBR | — |
| | THICKNESS($\mu$m) | 100 | 100 | 100 | — |
| PRODUCT THICKNESS(mm) | | 0.45 | 0.45 | 0.40 | ($\phi$1.8) |
| LEAKAGE AMOUNT | 6.3S  40°C | — | 0.00g/WEEK | 0.00g/WEEK | 0.02g/WEEK |
| | 6.3S  80°C | 1.21g/WEEK | 0.03g/WEEK | 0.01g/WEEK | 0.05g/WEEK |
| | 6.3S  120°C | — | 0.06g/WEEK | 0.01g/WEEK | 0.13g/WEEK |
| | 12.5S  80°C | — | 0.03g/WEEK | 0.02g/WEEK | 0.05g/WEEK |

FIG. 4B

| SAMPLE | | D | E | F | G |
|---|---|---|---|---|---|
| METAL PORTION | MATERIAL | SUS | SUS | SUS | SUS |
| COATING LAYER | MATERIAL | — | NBR | NBR | NBR |
| | THICKNESS($\mu$m) | — | 25 | 50 | 100 |
| PRODUCT THICKNESS(mm) | | 0.20 | 0.25 | 0.30 | 0.40 |
| LEAKAGE AMOUNT | 6.3S  40°C | 0.06g/WEEK | — | — | 0.00g/WEEK |
| | 6.3S  80°C | 0.18g/WEEK | 0.00g/WEEK | 0.01g/WEEK | 0.01g/WEEK |
| | 6.3S  120°C | 0.18g/WEEK | 0.00g/WEEK | 0.01g/WEEK | 0.01g/WEEK |
| | LONG TIME  120°C | — | 0.01g/WEEK | 0.02g/WEEK | 0.04g/WEEK |

GASKET ATTACHMENT STRUCTURE FOR REFRIGERANT-SEAL

CROSS-REFERENCE TO RELATED APPLICATION

This application is related to Japanese Patent Application No. 2000-191728 filed on Jun. 26, 2000, the contents of which are hereby incorporated by reference.

BACKGROUND OF THE INVENTION

1. Field of the Invention

The present invention relates to an attachment structure of a gasket used as a seal member of a refrigerant pipe having therein a refrigerant such as carbon dioxide ($CO_2$), that is used at a high-pressure.

2. Description of Related Art

When carbon dioxide or the like is used as refrigerant of a refrigerant cycle so that a high-pressure side refrigerant pressure becomes equal to or larger than the critical pressure, the refrigerant pressure becomes higher by 10 times or more, as compared with a general refrigerant cycle using flon as refrigerant. With the increase of the refrigerant pressure in the high-pressure side pipe, a seal member attached to a connection part of pipe members is need to be constructed by a compressive structure. For example, when an O-ring made of a porous material is used as a seal member for connecting pipe members, refrigerant readily penetrates the porous material, and sealing performance may be decreased. On the other hand, when a connection structure of the pipe members is sealed using a metal plate, because the metal plate cannot completely contact a seal surface, a gas leakage may be readily caused.

SUMMARY OF THE INVENTION

In view of the foregoing problems, it is an object of the present invention to provide an attachment structure of a semi-metal gasket for a refrigerant-seal, which improves a sealing performance of high-pressure refrigerant.

It is an another object of the present invention to provide an attachment structure of a semi-metal gasket having a deformation portion deformable in a thickness direction of the semi-metal gasket so that a leakage of high-pressure refrigerant is made in minimum.

According to the present invention, an attachment structure of a gasket for a refrigerant-seal includes a first connection member and a second connection member. The first connection member has a first opposite surface opposite to one side surface of the gasket, and a first wall surface opposite to one end surface of the gasket. Further, a second connection member has a second opposite surface opposite to the other side surface of the gasket and a second wall surface opposite to the other end surface of the gasket. The first and second connection members are disposed to define a seal space by the first and second opposite surfaces and the first and second wall surfaces, the gasket is constructed by a metal portion and both film coating layers provided on both side surfaces of the metal portion in a thickness direction to have a deformation portion deformable in the thickness direction. In the attachment structure, the gasket is disposed in the seal space in such a manner that the one end surface of the gasket is held on the first wall surface and the other end surface of the gasket is separated from the second wall surface by a predetermined clearance, before both the first and second connection members are fastened. Further, the gasket extends in an extension direction approximately perpendicular to the thickness direction, and the other end surface of the gasket press-contacts the second wall surface, after both the first and second connection members are fastened. When both the first and second connection members are fastened, the first end surface of the gasket presses against the first wall surface of the first connection member, and the second end surface of the gasket presses against the second wall surface of the second connection member to generate a reaction force. Due to the reaction force, the gasket presses both the first and second opposite surfaces of the first and second connection members, so that sealing pressure of the gasket is improved. As a result, even when the attachment structure is used for a refrigerant connection pipe through which high-pressure refrigerant flows, a sealing performance of high-pressure refrigerant in the refrigerant connection pipe is improved. Thereby, a leakage of high-pressure refrigerant can be made minimum.

Further, because the gasket is disposed in the seal space partially, the gasket can be manufactured in low cost, and the attachment structure of the gasket can be made smaller. Accordingly, fastening force for fastening both the first and second connection members can be made smaller.

Preferably, when a radial dimension of the gasket before fastening is as Lg, a radial dimension of the seal space is as Lb, and a radial dimension of the gasket after fastening is as Lg', a ratio of Lg/Lb is equal to or larger than 0.85, and a ratio of Lg'/Lb is equal to or larger than 1. In this case, the seal pressure of the gasket can be further increased, and the leakage of the refrigerant can be further prevented.

More preferably, the ratio of Lg/Lb is in a range of 0.90–0.97. In this case, the effect of the present invention can be further improved.

Preferably, a thickness of each coating layer is in a range of 1–100 $\mu$m. Accordingly, even when a material for forming the coating layer is changed, the leakage of the refrigerant can be prevented.

BRIEF DESCRIPTION OF THE DRAWINGS

Additional objects and advantages of the present invention will be more readily apparent from the following detailed description of preferred embodiments when taken together with the accompanying drawings, in which:

FIG. 2A is a sectional view showing an arrangement state of the gasket before both first and second connection members are fastened, FIG. 2B is a sectional view showing a press-extension state of the gasket after both the first and second connection members are fastened, and FIG. 2C is a sectional view showing an another arrangement state of the gasket before both the first and second connection members are fastened, according to the first embodiment of the present invention;

FIG. 4A is a view for explaining experiment results when a metal material is changed, and FIG. 4B is a view for explaining experiment results when a coating material is changed, according to the first embodiment;

DETAILED DESCRIPTION OF THE PRESENTLY PREFERRED EMBODIMENTS

Preferred embodiment of the present invention will be described hereinafter with reference to the accompanying drawings.

A first preferred embodiment of the present invention will be now described with reference to FIGS. 1–5. In the first embodiment, for using carbon dioxide ($CO_2$) as refrigerant, an approximately closed seal space is formed between both first and second connection members, and a semi-metal gasket is inserted into the seal space.

Figure 1:
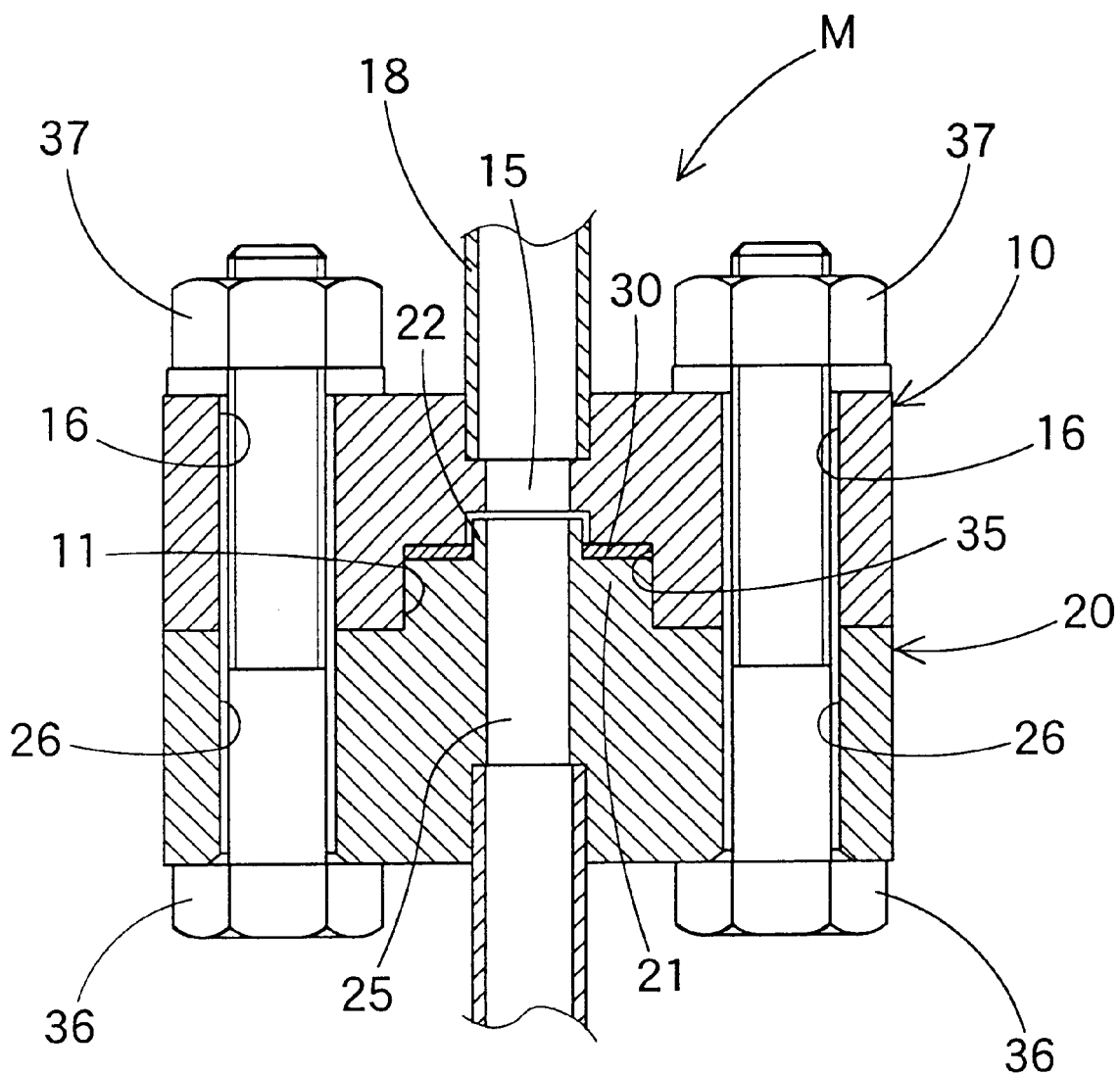
FIG. 1 is a partial-sectional view showing an attachment structure of a gasket for a refrigerant-seal, according to a preferred embodiment of the present invention.

FIG. 1 shows an attachment structure M of a gasket for a refrigerant-seal. In FIG. 1, a first connection member 10 and a second connection member 20 are disposed to define a seal space 35, a flat gasket 30 is disposed in the seal space 35 to contact opposite surfaces of the first connection member 10 and the second connection member 20. The first connection member 10 is connected to a pipe member 18 at an upper side, and is disposed at an upper side of the second connection member 20.

A cylindrical recess portion 11 is provided in the first connection member 10 at a lower center portion to be recessed from a lower surface to an upper side, so that a first refrigerant passage 15 is formed along an axial direction of the cylindrical shape. Further, both bolt insertion holes 16 are provided in the first connection member 10 at both positions to be parallel to the axial direction.

A protrusion portion 21 is provided in the second connection member 20 to be engaged with the cylindrical recess portion 11 of the first connection member 10, and a protrusion 22 protruding from the protrusion portion 21 is provided to be inserted into the first refrigerant passage 15. Further, a second refrigerant passage 25 is formed to be connected to the first refrigerant passage 15, and both bolt insertion holes 26 are provided in the second connection member 20 on the same axial lines of both the bolt insertion holes 16, respectively.

As shown in FIG. 2A, the seal space 35 for inserting therein the gasket 30 is formed between a bottom surface 12 (opposite surface) and an inner peripheral surface 13 (second wall surface) of the recess portion 11 of the first connection member 10 as well as a top surface 23 (opposite surface) of the protrusion portion 21 of the second connection member 20 and an outer peripheral surface (first wall surface) of the protrusion 22. Accordingly, by fastening bolts 36 using nuts 37 after the bolts 36 are inserted into the bolt insertion holes 16, 26, a refrigerant passage from the first refrigerant passage 15 to the second refrigerant passage 25 can be formed. Thus, refrigerant flows through the first refrigerant passage 15 and the second refrigerant passage 25 without a refrigerant leakage (see FIG. 1).

Figure 3:
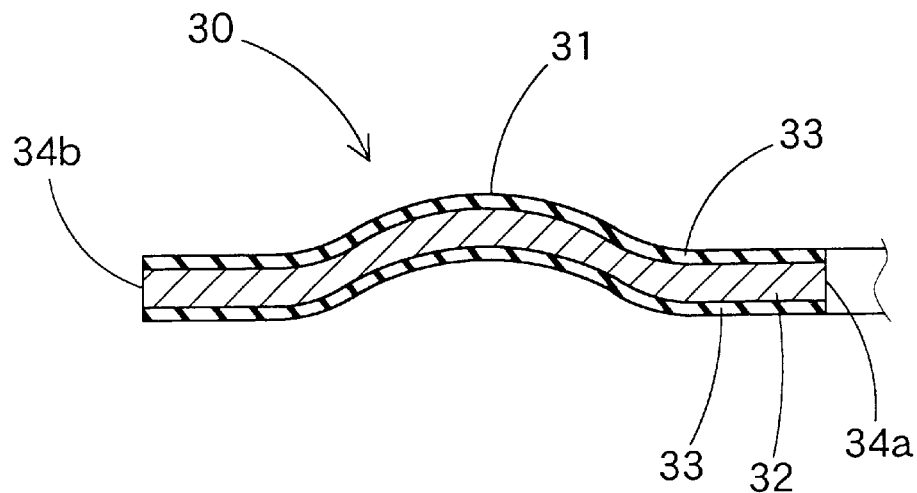
FIG. 3 is a sectional view of a flat gasket having a bead portion formed by embossing, according to the first embodiment.

In the first embodiment, as shown in FIG. 2A, the gasket 30 is formed by embossing to have a bead portion 31 at an upper side. However, the bead portion 31 may be provided in the gasket 30 at a lower side. As shown in FIG. 3, the gasket 30 has a metal portion 32 and both coating layers 33 provided at both side surfaces of the metal portion 32, and is formed into an approximate circular shape. The metal portion 32 is formed by a SUS material, for example. On the other hand, the coating layer 33 is made of a rubber coating polymer composed of IIR, NBR, H.NBR or FKM or the like. Alternatively, the coating layer 33 can be made of a resin composed of PTFE, nylon, PP, PE or the like. Alternatively, the coating layer 33 can be made of a metal such as Sn, Zn, Pb or Cu.

A thickness of each coating layer 33 is formed to be 1–100 $\mu$m. As shown in FIG. 4B, as the coating layer 33 is made thinner, a leakage-preventing performance of refrigerant can be improved. Preferably, the thickness of the coating layer 33 is about 25 $\mu$m. When the thickness of the coating layer 33 is about 25 $\mu$m, the leakage amount of carbon dioxide can be made minimum even when a material for forming the coating layer 33 is changed, as shown in FIGS. 4A and 4B.

As shown in FIG. 2A, the gasket 30 has an inner peripheral end surface 34a with an inner radius approximately equal to an outer radius of an outer peripheral wall surface 24 of the protrusion 22 of the second connection member 20, so that the inner peripheral end surface 34a of the gasket 30 is supported in the outer peripheral wall surface 24. On the other hand, an outer peripheral end surface 34b of the gasket 30 is separated from the inner peripheral wall surface 13 of the recess portion 11 of the first connection member 10 so that a clearance is formed between the outer peripheral end surface 34b of the gasket 30 and the inner peripheral wall surface 13 of the recess portion 11. In this state, as shown in FIG. 2B, when the first connection member 10 and the second connection member 20 are fastened by fastening the nut 37, the bottom surface 12 of the recess portion 11 of the first connection member 10 presses the bead portion 31 to press-extend the gasket 30, so that the outer peripheral end surface 34b of the gasket 30 extends radial outside and the inner peripheral end surface 34a extends radial inside. Accordingly, the outer peripheral end surface 34b of the gasket 30 press-contacts the inner peripheral wall surface 13 of the recess portion 11 of the first connection member 10, and a compression force is applied to the inner peripheral wall surface 13 of the recess portion 11 of the first connection member 10. Simultaneously, the inner peripheral end surface 34a of the gasket 30 press-contacts the outer peripheral wall surface 24 of the protrusion 22 of the second connection member 20, and a compression force is applied to the outer peripheral wall surface 24 of the protrusion 22 of the second connection member 20. The compression force generates a local surface pressure due to a reaction force of the compression force, and the generated local surface pressure of the gasket 20 is used as a force for pressing the bottom surface 12 of the recess portion 11 of the first connection member 10 and the upper surface 23 of the protrusion portion 21 of the second connection member 20, thereby improving a sealing pressure of the gasket 30.

In the first embodiment, the gasket 30 can be inserted into the seal space 35 as shown in FIG. 2C. That is, in FIG. 2C, the gasket 30 is formed into a shape, so that the outer peripheral end surface 34b of the gasket 30 is held in the inner peripheral wall surface 13 of the recess portion 11 of the first connection member 10, and the inner peripheral end surface 34a of the gasket 30 is separated from the outer peripheral wall surface 24 of the protrusion 22 of the second connection member 20. Even in this case of FIG. 2C, when the bead portion 31 of the gasket 30 is pressed, the inner peripheral end surface 34a of the gasket 30 extends radial inside to press the outer peripheral wall surface 24 of the protrusion 22 of the second connection member 20, and the outer peripheral end surface 34b of the gasket 30 extends radial outside to press the inner peripheral wall surface 13 of the recess portion 11 of the first connection member 10. Thus, similarly to FIG. 2B, compression force of the gasket 30 is applied to the bottom surface 12 of the first connection member 10 and the top surface 23 of the second connection member 20, thereby increasing the seal pressure of the gasket 30.

Next, the dimensions of the gasket 30 and the seal space 35 will be now described in detail. As shown in FIG. 2A, when a radial dimension of the embossed gasket 30 is as Lg and a radial dimension of the seal space 35 between the inner peripheral wall surface 13 of the recess portion 11 of the first connection member 10 and the outer peripheral wall surface 24 of the protrusion 22 of the second connection member 20 is as Lb, a ratio Lg/Lb is set to be equal to or larger than 0.85. More preferably, the ratio Lg/Lb is set in a range of 0.9–0.97. In this case, as shown in FIG. 2B, when the first connection member 10 and the second connection member are fastened and the gasket 30 is pressed, the press-extended radial dimension Lg' becomes equal to or larger than the radial dimension Lb (i.e., Lg'/Lb≧1), and the gasket 30 presses against the opposite surfaces 12, 23 of the first connection member 10 and the second connection member 20. Accordingly, the seal pressure of the gasket 30 can be increased.

In the attachment structure M of the first embodiment, the gasket 30 can be partially disposed between the first connection member 10 and the second connection member 20, and the size of the gasket 30 can be made smaller. Accordingly, the cost of the gasket 30 can be decreased, the size of the attachment structure M can be made smaller, and a fastening force for fastening both the first connection member 10 and the second connection member 20 can be made smaller so that the fastening operation of both the first and second connection members 10, 20 can be made easy.

FIGS. 4A and 4B show experimental results using different samples A–G of the gasket 30, and a comparison example using an IIR O-ring, when carbon dioxide with 15 Mp pressure is sealed. In FIG. 4A, the leakage amount of carbon dioxide for one week is detected when the material of the metal portion 32 is changed. As shown in FIG. 4A, the leakage amount can be made smaller when the gasket 30 of the present invention is used, as compared with a case using the O-ring. On the other hand, in FIG. 4B, the leakage amount of carbon dioxide for one week is detected when the thickness of the coating layer is changed. As shown in FIG. 4B, as the coating layer 33 is made thinner, a leakage-preventing performance of refrigerant can be improved. When the thickness of the coating layer 33 is about 25 μm, the leakage amount of carbon dioxide can be made minimum even when a material for forming the coating layer 33 is changed.

Figure 5:
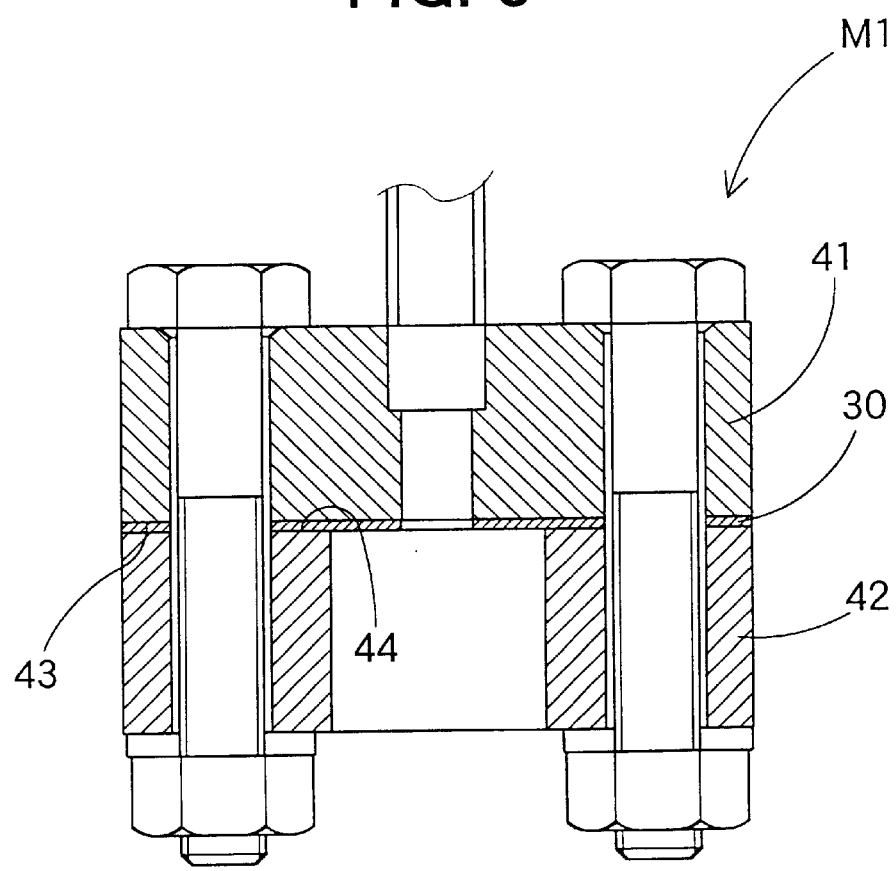
FIG. 5 is a partial sectional view showing a gasket attachment structure of a comparison example.

When the gasket 30 is disposed between the connection members 41, 42 in an attachment structure M2 used as a comparison example in FIG. 5, the gasket 30 contacts almost a lower surface 43 of the connection member 41 and almost an upper surface 44 of the connection member 42 by fastening both bolts. However, in the comparison attachment structure M2 of FIG. 5, when the connection members 41, 42 are fastened, the bead portion 31 formed by embossing is deformed, and the gasket 30 is deformed to a complete flat shape. In this case, a sufficient seal pressure of the gasket 30 cannot be applied to the surfaces 43, 44 of the connection members 41, 42. That is, when the deformation of the bead portion 31 becomes larger than a predetermined value, compression pressure pressing the surfaces 43, 44 of the connection members 41, 42 due to the bead portion 31 is applied in a horizontal direction because of the complete flat deformation of the bead portion 31 of the gasket 30. Accordingly, in the comparison attachment structure M2 of FIG. 5, the seal pressure of the gasket 30 is decreased, and the sealing performance of the gasket 30 is deteriorated.

According to the first embodiment of the present invention, before the first and second connection members 10, 20 are fastened, one of the inner peripheral end surface 34a and the outer peripheral end surface 34b of the gasket 30 contacts one of the outer peripheral wall surface 24 of the second connection member 20 and the inner peripheral wall surface 13 of the first connection member 10, and the other one of the inner peripheral end surface 34a and the outer peripheral end surface 34b of the gasket 30 is separated from the other one of the outer peripheral wall surface 24 of the second connection member 20 and the inner peripheral wall surface 13 of the first connection member 10. In this case, the ratio Lg/Lb is set to be equal to or larger than 0.85. On the other hand, after both the first and second connection members 10, 20 are fastened, the gasket 30 extends in the radial direction so that the other one of the inner peripheral end surface 34a and the outer peripheral end surface 34b press-contacts the other one of the outer peripheral wall surface 24 of the second connection member 20 and the inner peripheral wall surface 13 of the first connection member 10. Therefore, the inner and outer peripheral end surfaces 34a, 34b of the gasket 30 press the peripheral wall surfaces 24, 13, and the reaction force is applied to the gasket 30 due to this compression. Due to the reaction force, the gasket 30 presses relative to the opposite surfaces 12, 23 of the first and second connection members 10, 20, and the seal pressure of the gasket 30 can be increased. In this case, the bead portion 31 is partially deformed so that the lower side surface of the gasket 30 partially contacts the top surface 23 of the second connection member 20, and the upper side surface of the bead portion 31 of the gasket 30 partially contacts the bottom surface 12 of the first connection member 10. Accordingly, in the attachment structure M1 of the first embodiment, both the first and second connection members 10, 20 can be readily fastened, because the fastening force during the fastening operation of the first and second connection members 10, 20 can be made smaller. As a result, the sealing performance of the gasket 30 can be improved, as compared with the comparison example M2.

Figure 6:
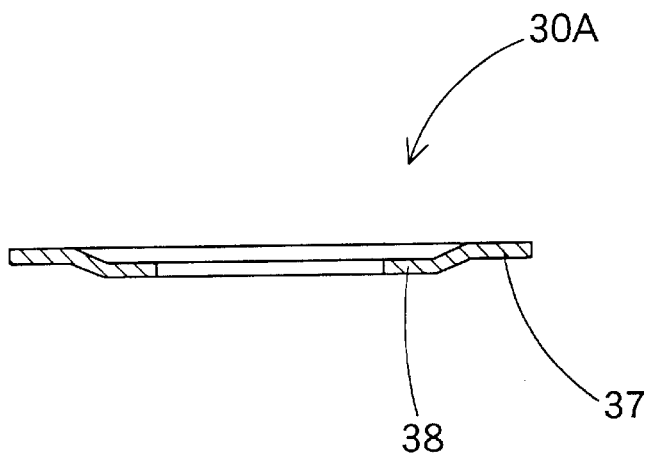
FIG. 6 is a schematic sectional view showing a gasket according to a second preferred embodiment of the present invention.
Figure 7:
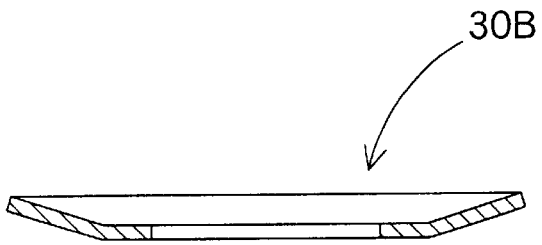
FIG. 7 is a schematic sectional view showing a gasket according to the second embodiment.

A second preferred embodiment of the present invention will be now described with reference to FIGS. 6 and 7. In the above-described first embodiment, the gasket 30 is formed by embossing to has the one bead portion 31. However, in the second embodiment, the shape of the gasket is changed, and a gasket 30A shown in FIG. 6 or a gasket 30B shown in FIG. 7 is used instead of the gasket 30 of the above-described first embodiment. The gasket 30A is formed into a dish like having an upper flange portion 37 and a bottom plate portion 38, and the gasket 30B is formed into a taper shape. Even any one of the gaskets 30A, 30B is used to be inserted into the seal space 35, when the gasket 30A, 30B is disposed so that an inner peripheral end surface of the gasket 30A, 30B is held in the outer peripheral wall surface 24 of the second connection member 20 and an outer peripheral end surface of the gasket 30A, 30B presses against the inner peripheral wall surface 13 of the first connection member 10, the effect of the above-described first embodiment can be obtained.

Figure 8:
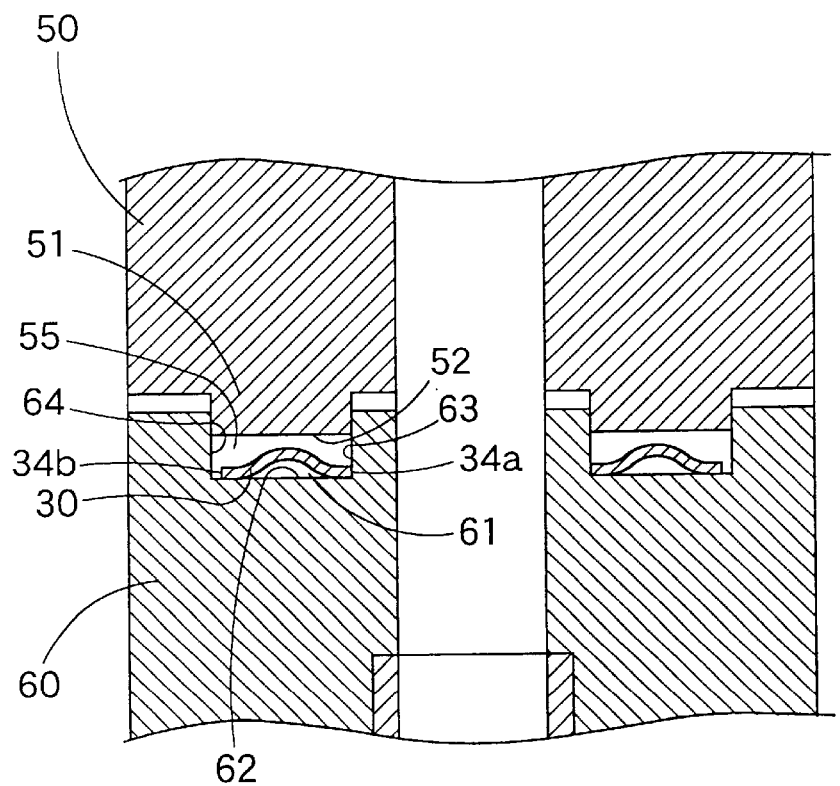
FIG. 8 is a partial sectional view showing an attachment structure of a gasket according to a third preferred embodiment of the present invention.

A third preferred embodiment of the present invention will be now described with reference to FIG. 8. In the third embodiment, an attachment structure of the gasket 30 is changed as shown in FIG. 8. That is, as shown in FIG. 8, a ring-like protrusion 51 protruding downwardly is provided in the first connection member 50 to opposite to a second connection member 60, a ring-like recess portion 61 is provided in a second connection member 60 on a surface opposite to the first connection member 50 to be engaged with the ring-like protrusion 51, and both the first and second connection members 50, 60 are disposed to form a seal space 55 in which the gasket 30 is attached. In this attachment structure of FIG. 8, a first wall surface 63 (corresponding to outer peripheral wall surface of the first embodiment) and a second wall surface 64 (corresponding to inner peripheral wall surface of the first embodiment) are provided in the second connection member 60. That is, the seal space 55 is defined by a bottom surface 52 of the protrusion 51, a bottom surface 62 of the recess portion 61 and the first and second wall surfaces 63, 64 of the recess portion 61 of the second connection member 60. Even in this case, before the first connection member 50 and the second connection member 60 are fastened, the inner peripheral end surface 34a of the gasket 30 is supported in the first wall surface 63 of the recess portion 61, and the outer peripheral end surface 34b of the gasket 30 is separated from the second wall surface 64 of the recess portion 61 to form a clearance therebetween. After both the first and second connection members 50, 60 are fastened, the outer peripheral end surface 34b of the gasket 30 presses against the second wall surface 64 of the recess portion 61, so that the reaction force is applied to the gasket 30 and seal pressure of the gasket 30 is applied to the opposite surfaces 52, 62 of the first and second connection members 50, 60. In the attachment structure of FIG. 8, the ring-like recess portion 61 is provided in the second connection member 60, and the ring-like protrusion 51 is provided in the first connection member 50. However, a ring-like protrusion may be provided in the second connection member 60, and a ring-like recess portion may be provided in the first connection member 50.

Figure 9:
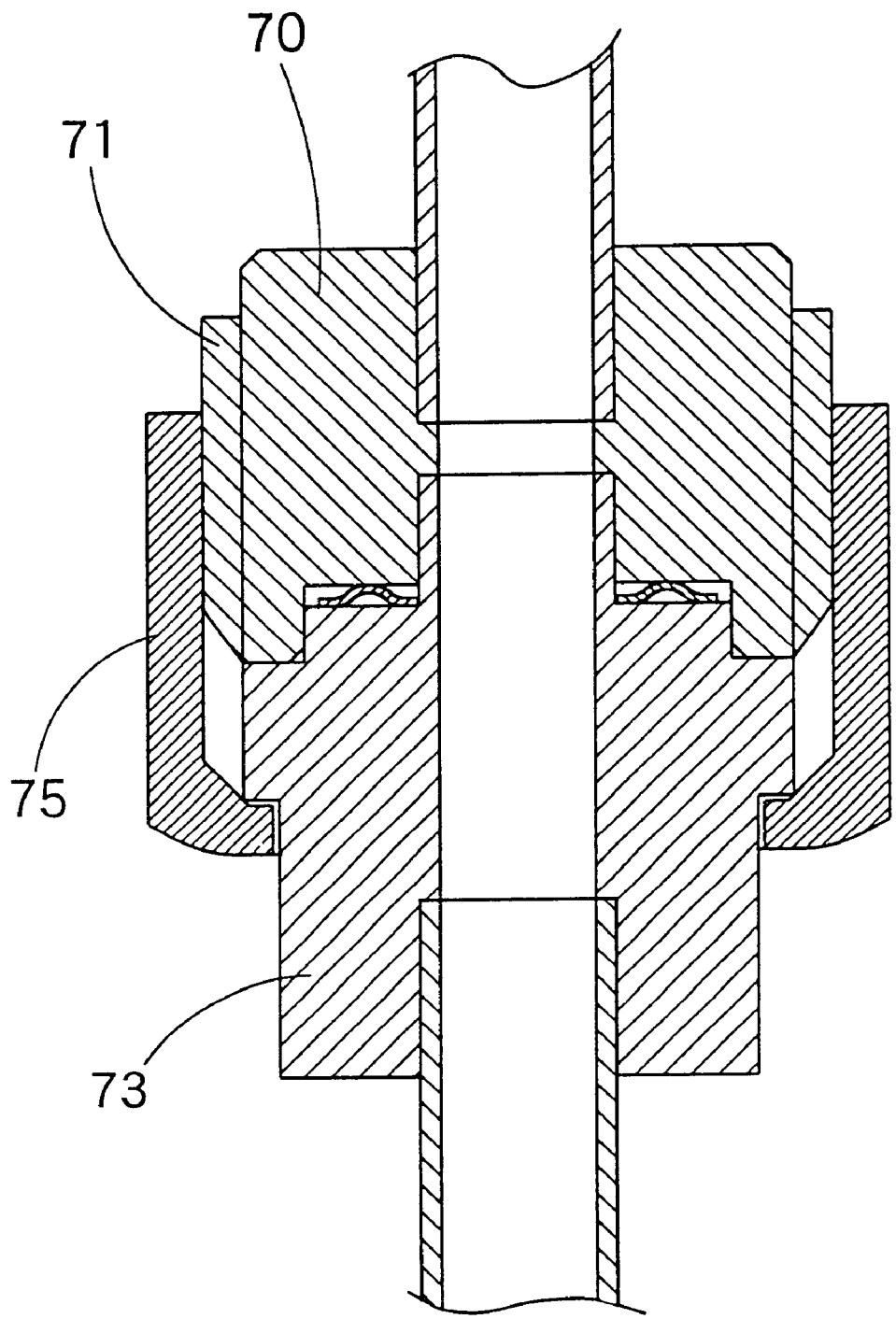
FIG. 9 is a partial sectional view showing an attachment structure of a gasket according to a fourth preferred embodiment of the present invention.

A fourth preferred embodiment of the present invention will be now described with reference to FIG. 9. In an attachment structure shown in FIG. 9, both first and second connection members 70, 73 are fastened without using the above-described bolt and nut. In this case, a male screw 71 is provided on an outer peripheral surface of the first connection member 70, and the first and second connection members 70, 73 are fastened by a cap nut (box nut) 75.

Figure 10A:
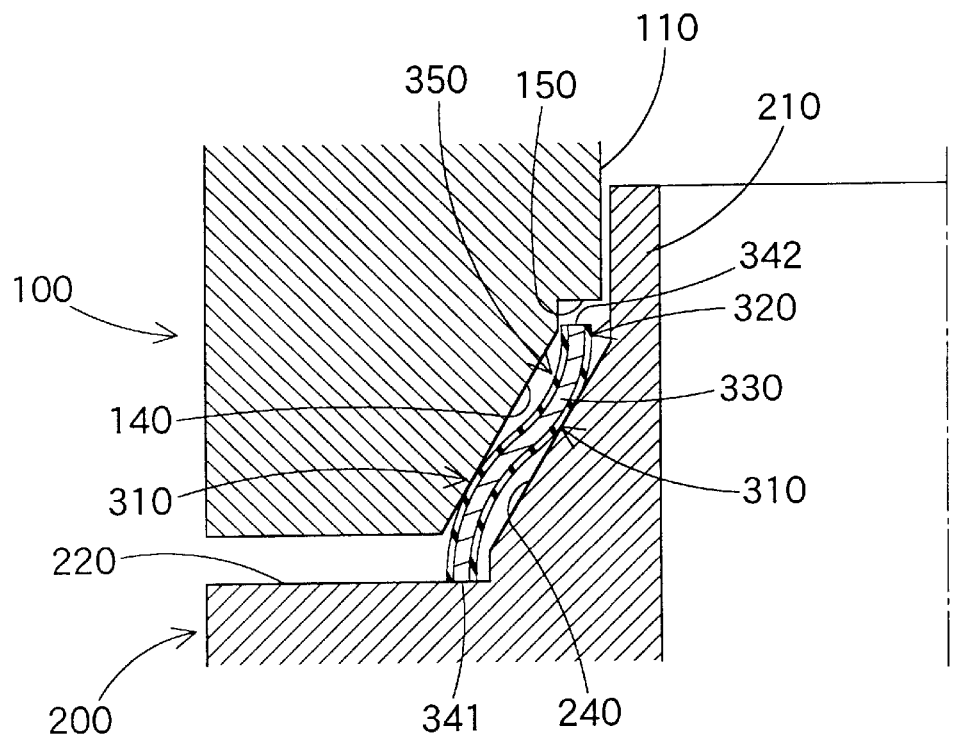
FIG. 10A a sectional view showing an arrangement state of a S-shaped gasket before both first and second connection members are fastened.
Figure 10B:
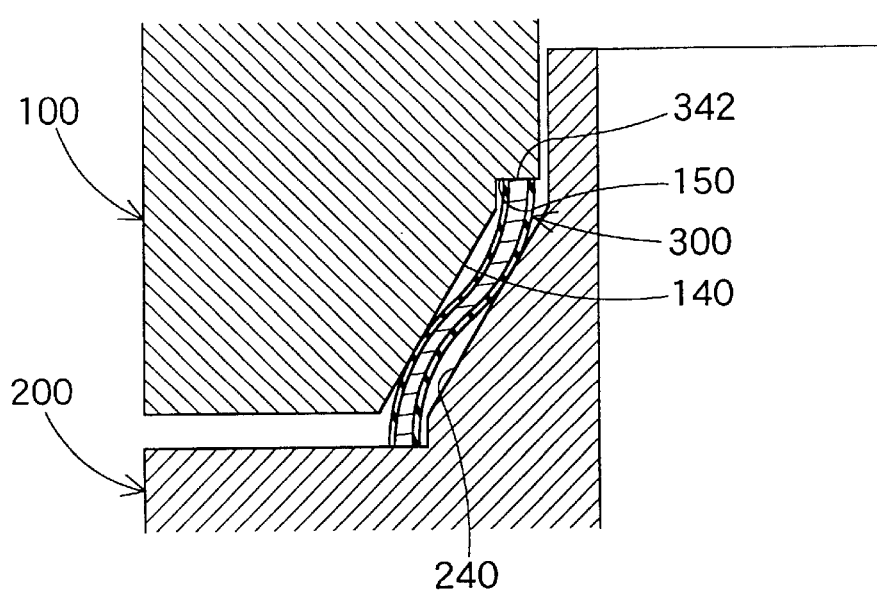
FIG. 10B is a sectional view showing a press-extension state of the gasket after both the first and second connection members are fastened.

A fifth preferred embodiment of the present invention will be now described with reference to FIGS. 10A and 10B. In the fifth embodiment, an attachment structure of a gasket 300 is formed into as shown in FIGS. 10A and 10B. The gasket 300 is formed substantially into a S-shape in cross-section to have both bead portions 310 at both sides. The gasket 300 has a metal portion 320, and both thin coating layers 330 provided at both inner and outer sides of the metal portion 320. In the attachment structure of FIGS. 10A, 10B, a first connection member 100 is formed into a circular shape having therein a hollow portion 110. On the other hand, a second connection member 200 is formed into a columnar to have a protrusion 210 inserted into the hollow portion 110 of the first connection member 100 and a flange surface (first wall surface) 220 around the protrusion 210. Each of the first and second connection members 100, 200 is formed around an axial line so that a refrigerant passage is formed in the axial line portion. The gasket 300 is inserted into the seal space 350 defined by the first connection member 100 and the second connection member 200. Specifically, the seal space 350 is defined by an inner taper surface 140 extending downwardly and a recessed bottom surface (second wall surface) 150 recessed at an upper end of the inner taper surface 140 to have a radial dimension larger than the hollow portion 110 in the first connection member 100, as well as, the flange surface 220 (first wall surface) and an outer taper surface 240 in the second connection member 200. The outer taper surface 240 provided on the outer peripheral surface of the protrusion 210 of the second connection member 200 is tilted by a tilt angle approximately equal to that of the inner taper surface 140 of the first connection member 100.

When both the first and second connection members 100, 200 are not fastened as shown in FIG. 10A, the S-shaped gasket 300 is disposed in the seal space 350, so that a lower end surface 341 of the gasket 300 is held in the flange surface 220 (first wall surface) of the second connection member 200, 20 and an upper end surface 342 of the gasket 300 is separated from the recessed bottom surface (second wall surface) 150 of the first connection member 100. Further, when the first connection member 100 is fastened to the second connection member 200 as shown in FIG. 10B, the inner taper surface 140 of the first connection member 100 presses the gasket 300 so that the upper end surface 342 of the gasket 300 extends upwardly to contact the recessed bottom surface (second wall surface) 150 of the first connection member 100. In this state, when the first connection member 100 is further fastened to the second connection member 200, the upper end surface 342 of the gasket 300 press-contacts the recessed bottom surface (second wall surface) 150 of the first connection member 100, and the lower end surface 341 of the gasket 300 press-contacts the flange surface 220 of the second connection member 200, due to the compression force of the bead portions 310 of the S-shaped gasket 300. The compression force of both the upper and lower end surfaces 342, 341 of the gasket 300 generates a reaction force, and the reaction force becomes local surface pressure, so that the gasket 300 partially presses the inner taper surface 140 of the first connection member 100 and the outer taper surface 240 of the second connection member 200. Accordingly, the sealing pressure of the gasket 300 in the attachment structure can be increased. As a result, a refrigerant leakage can be made minimum.

Although the present invention has been fully described in connection with the preferred embodiments thereof with reference to the accompanying drawings, it is to be noted that various changes and modifications will become apparent to those skilled in the art.

For example, in the attachment structure M of the above-described first embodiment, a protrusion protruding toward the second connection member 20 may be provided in the first connection member 10 to have an outer peripheral wall surface supporting the inner peripheral end surface 34a of the gasket 30, and a recess portion may be provided in the second connection member 20 to have an inner peripheral wall surface on which the outer peripheral end surface 34a of the gasket 30 is pressed.

In the above-described first embodiment, by pressing the bead portion 31 of the gasket 30, the gasket 30 extends in the radial inside direction and in the radial outside direction. However, the gasket 30 may be extended in one side direction between the radial inside direction and the radial outside direction by pressing the bead portion 31.

In the above-described first embodiment, the gasket 30 is formed into a round shape, however, may be formed into the other shape. For example, the gasket 30 may be formed into a dish shape having a bottom portion and an upper flange portion, or may be formed into a taper shape tapered downwardly.

In the above-described embodiments, the present invention is applied to the attachment structure of the gasket for a refrigerant-seal. However, the present invention may be applied to a seal structure of both connection members using a gasket. Further, the present invention can be applied to a seal structure of both connection members defining a fluid passage through which a fluid flows.

Such changes and modifications are to be understood as being within the scope of the present invention as defined by the appended claims.

What is claimed is:

1. An attachment structure of a gasket for a refrigerant-seal, comprising:
    a first connection member having a first opposite surface opposite to one side surface of the gasket, and a first wall surface opposite to one end surface of the gasket; and
    a second connection member having a second opposite surface opposite to the other side surface of the gasket, and a second wall surface opposite to the other end surface of the gasket, wherein:
      the first and second connection members are disposed to define a seal space by the first and second opposite surfaces and the first and second wall surfaces;
      the gasket is constructed by a metal portion and a film coating layer provided on both side surfaces of the metal portion in a thickness direction to have a deformation portion deformable in the thickness direction;
      the gasket is disposed in the seal space in such a manner that the one end surface of the gasket contacts the first wall surface and the other end surface of the gasket is separated from the second wall surface by a predetermined clearance, before the first and second connection members are fastened; and
      the gasket extends in an extension direction approximately perpendicular to the thickness direction, and the other end surface of the gasket press-contacts the second wall surface, after the first and second connection members are fastened.

2. The attachment structure according to claim 1, wherein:
    the gasket has an approximate circular shape;
    the seal space has a shape corresponding to the gasket;
    the one end surface and the other end surface of the gasket are provided at different positions in a radial direction; and
    the gasket extends in the radial direction while both the first and second connection members are fastened.

3. The attachment structure according to claim 2, wherein:
    when a radial dimension of the gasket before fastening is as Lg, a radial dimension of the seal space is as Lb, and a radial dimension of the gasket after fastening is as Lg', a ratio of Lg/Lb is equal to or larger than 0.85, and a ratio of Lg'/Lb is equal to or larger than 1.

4. The attachment structure according to claim 3, wherein the ratio of Lg/Lb is in a range of 0.90–0.97.

5. The attachment structure according to claim 2, wherein the one end surface of the gasket entirely circumferentially contacts the first wall surface before both the first and second connection members are fastened.

6. The attachment structure according to claim 1, wherein the deformation portion of the gasket is an embossed bead portion.

7. The attachment structure according to claim 6, wherein the gasket has an approximate equal thickness.

8. The attachment structure according to claim 1, wherein a thickness of each coating layer is in a range of 1–100 $\mu$m.

9. The attachment structure according to claim 1, wherein the gasket is disposed in the seal space in such a manner that both the film coating layers provided on the side surfaces of the gasket partially contact the first and second opposite surfaces, respectively.

10. The attachment structure according to claim 1, wherein:
    the gasket has an approximate S-shaped cross-section tapered in a radial outside;
    the deformation portion has a bead portion embossed at both sides to form the approximate S-shaped cross-section;
    the first and second wall surfaces are provided approximately horizontally; and
    the first and second opposite surfaces are tilted relative to the first and second wall surfaces, respectively.

11. The attachment structure according to claim 1 wherein the one end surface of the gasket press-contacts the first wall surface after both the first and second members are fastened.

12. The attachment structure according to claim 1, wherein the entire one end surface of the gasket entirely contacts the first wall surface before both the first and second connection members are fastened.

13. An attachment structure of a gasket for a refrigerant-seal, comprising:
    a first connection member having a recess portion with a first opposite surface opposite to one side surface of the gasket, and first and second wall surfaces opposite to each other; and
    a second connection member having a protrusion engaged with the recess portion to form a seal space, the protrusion having a second opposite surface opposite to the other side surface of the gasket, wherein:
      the seal space is defined by the first and second opposite surfaces and the first and second wall surfaces;
      the gasket is constructed by a metal portion and a film coating layer provided on both side surfaces of the metal portion in a thickness direction to have a deformation portion deformable in the thickness direction;
      the gasket is disposed in the seal space in such a manner that the one end surface of the gasket contacts the first wall surface and the other end surface of the gasket is separated from the second wall surface by a predetermined clearance, before the first and second connection members are fastened; and
      the gasket extends in an extension direction approximately perpendicular to the thickness direction, and the other end surface of the gasket press-contacts the second wall surface, after the first and second connection members are fastened.

14. The attachment structure according to claim 13 wherein the one end surface of the gasket press-contacts the first wall surface after both the first and second members are fastened.

15. A seal structure of both first and second connection members defining a fluid passage through which a fluid flows, the seal structure comprising:
- a gasket constructed by a metal portion and a film coating layer provided on both side surfaces of the metal portion in a thickness direction to be deformable in the thickness direction, the gasket having a ring shape with inner and outer peripheral end surfaces in a radial direction wherein:
    - the first connection member has a first opposite surface opposite to one side surface of the gasket, and a first wall surface opposite the inner peripheral end surface of the gasket;
    - the second connection member has a second opposite surface opposite to the other side surface of the gasket, and a second wall surface opposite to the outer peripheral end surface of the gasket;
    - the first and second connection members are disposed to define a seal space by the first and second opposite surfaces and the first and second wall surfaces;
    - the gasket is disposed in the seal space in such a manner that the inner peripheral end surface of the gasket contacts the first wall surface and the over peripheral end surface of the gasket is separated from the second wall surface by a predetermined clearance, before the first and second connection members are fastened; and
    - the gasket extends in a radial direction approximately perpendicular to the thickness direction, and the outer peripheral end surface of the gasket press-contacts the second wall surface, after the first and second connection members are fastened.

16. The attachment structure according to claim 15 wherein the inner peripheral surface of the gasket press-contacts the first wall surface after both the first and second members are fastened.

17. The seal structure according to claim 15, wherein the entire inner peripheral end surface of the gasket entirely circumferentially contacts the first wall surface before both the first and second connection members are fastened.

18. A connection structure forming a fluid passage, comprising:
- a ring shaped gasket defining upper and lower side surfaces, and inner and outer periphery surfaces, said gasket including a metal portion and film coating layers provided on both upper and lower side surfaces thereof to have a deformation portion deformable in a thickness direction thereof;
- a first connection member having a first fluid passage, and defining an opposite surface facing the upper side surface of said gasket, and an inner wall facing the outer periphery surface of said gasket; and
- a second connection member having a second fluid passage, and defining an opposite surface facing the lower side surface of said gasket, and an outer wall facing the inner periphery surface of said gasket, said second connection member connected to said first connection member for allowing the first fluid passage to communicate with the second fluid passage, wherein
    - the opposite surface and the inner wall of said first connection member, and the opposite surface and the outer wall of said second connection member define a seal space where said gasket is disposed,
    - before said second connection member is fastened to said first connection member, said gasket is disposed in the seal space in such a manner that the inner periphery surface thereof is entirely circumferentially in contact with the outer wall of said second connection member, and the outer periphery surface thereof is apart from the inner wall of said firs connection member with a predetermined clearance, and
    - when said second connection member is fastened to said first connection member, said gasket extends radially outwardly and the outer periphery surface thereof is press-contacted with the inner wall of said second connection member.

* * * * *